Patented Oct. 21, 1952

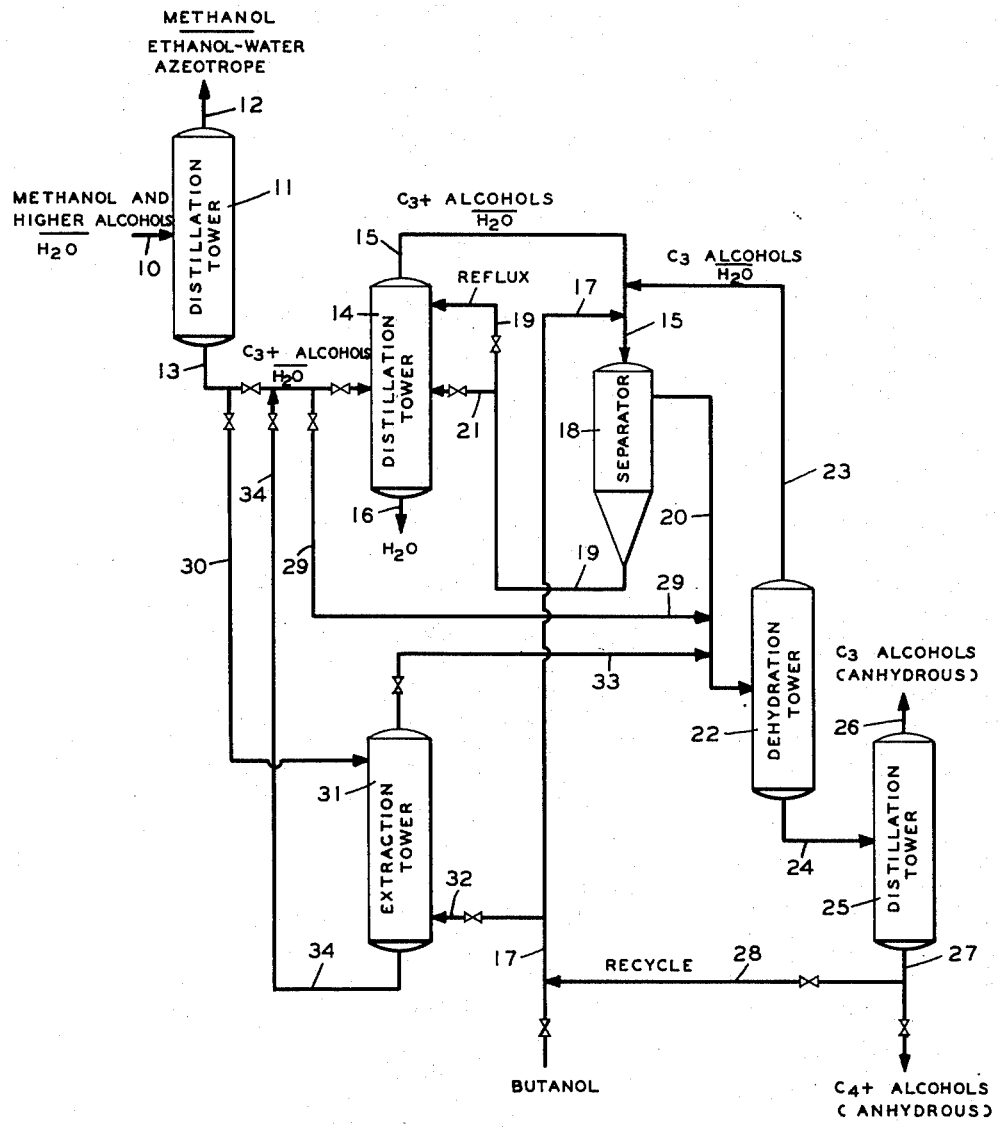

2,614,971

UNITED STATES PATENT OFFICE 2,614,971

DEHYDRATION OF ALCOHOLS

William P. Burton, Orange, N. J., assignor to The M. W. Kellogg Company, Jersey City, N. J., a corporation of Delaware Application April 29, 1948, Serial No. 23,891

14 Claims. (Cl. 202—42)

This invention relates to the dehydration of alcohols and relates more particularly to the dehydration of aqueous solutions of alcohols having at least three carbon atoms per molecule. Still more particularly, the invention relates to a method for the dehydration of aqueous solutions of alcohols having at least three carbon atoms per molecule in admixture with methanol and/or ethanol.

Heretofore several well-known methods have been employed for dehydrating methanol and higher alcohols to obtain marketable alcohols which are substantially water-free. In the utilization of these methods no particular difficulty is encountered in effecting the separation of commercially marketable methanol and ethanol from higher alcohols, by reason that methanol and ethanol can be readily distilled from their aqueous solutions containing higher alcohols, ethanol being obtained as its water-azeotrope, which is its commercially marketable form. However, in attempting to dehydrate $C_3$ and higher alcohols by the aforementioned methods, such as employing entrainers to take the water overhead by azeotropic distillation, it has been found that relatively large heat duties applied to distillation apparatus are required by reason of the proportionately large quantities of entrainer that are distilled. Furthermore, when aqueous solutions of $C_3$ or higher alcohols are subjected to fractionation, the resulting water-azeotropes of these alcohols represent the maximum degree of dehydration obtainable, excess water being removed as bottoms. On the other hand, when no excess of water over the alcohol-water azeotrope is present in the feed, the alcohol-water azeotropes are taken overhead, and some quantities of substantially water-free alcohols are recovered as bottoms. In none of these instances can water-free $C_3$ and higher alcohols be recovered quantitatively. Hence, from an economic standpoint, these methods in their various modifications have not, in the aforementioned respects, been found to be completely satisfactory.

It is, therefore, a primary object, and the process of the invention is directed, to provide for an economical method for the dehydration of aqueous solutions of alcohols having at least three carbon atoms per molecule.

Other objects and advantages inherent in the invention will be apparent from the following more detailed disclosure.

It is known that by admixing a higher-boiling alcohol with an aqueous solution of a lower-boiling alcohol, the latter having at least three carbon atoms per molecule, the lower-boiling alcohol may be partially recovered upon subsequent phase separation as an upper alcohol-rich phase containing the solvent higher-boiling alcohol and water, while the lower water-rich phase contains relatively minor proportions of the aforementioned alcohols. In this manner a partial degree of dehydration of the aqueous $C_3$ or higher-boiling alcohol is obtained.

In accordance with one modification of the process of the invention, I subject an aqueous solution of a $C_3$ or higher alcohol, or an aqueous mixture of $C_3$ and/or higher alcohols, to a primary distillation to take the alcohols overhead, either as their water-azeotropes or as alcohol-water mixtures, depending upon the quantity of water present in the feed, and the efficiency of the distillation. Excess water is removed as bottoms. I next contact this distillate or relatively low-boiling fraction, with a relatively water-insoluble alcohol as a solvent treating agent whose water-azeotropes will form two phases upon condensation. Hence, I employ such alcohols as solvent treating agents which have at least four carbon atoms per molecule, either in the anhydrous form or in aqueous solution, although for obvious reasons anhydrous alcohols are preferred. Upon contact with the treating agent, the aforementioned distillate separates into two phases, by reason of the insolubility of the treating agent and heavier alcohols in the water present. The phases thus produced comprise a lower water-rich phase and an upper alcohol-rich phase. The water-rich phase is refluxed to the distillation tower, while the upper alcohol-rich phase containing water in solution is transferred to a dehydration tower. The distillate from the dehydration step, comprising $C_3$ alcohols and water, is also transferred to the separation step, while bottoms from the dehydration tower comprising $C_3$ and/or higher alcohols, substantially water-free, are removed as a product of the process. It is preferable that a portion of these substantially water-free alcohols be recycled as the treating agent to the aforementioned separation step. This separation step may be carried out as a simple separation or as an extraction step comprising more than one stage, such as by employing a countercurrent extraction column, to effect more complete separation between the water and the alcohols to be dehydrated.

In another modification of the invention, the aforementioned feed of the aqueous solution of alcohols to be dehydrated, is given a preliminary extraction with the treating agent, prior to the aforementioned primary distillation. In such event the alcohol extract is employed as the feed to the alcohol dehydration step, while the raffinate is passed to the primary distillation step, for further treatment as described above. Other modifications of the process of the invention are also possible, as hereinafter described.

The particular novelty of the process of the invention lies in employing $C_4$ and/or higher alcohols as entraining or solvent treating agents and in the use of these treating agents for the extraction of $C_3$ and/or higher alcohols, which form minimum boiling azeotropes with water, from the distillate obtained in the primary distillation step. Hence, the attractive feaures of the invention lie in the economies resulting in effecting the aforementioned dehydration without the use of additional entraining agents, and in the removal of relatively large amounts of water as the bottoms product in the primary distillation step, with the attendant decrease in heat load over apparatus in which such water is removed as an overhead product. Similarly, the dehydration of $C_3$ and heavier alcohols before separation of individual components, permits the removal of the lower alcohols to be more easily accomplished than they would be in the presence of water.

The accompanying drawing illustrates, diagrammatically, one form of the apparatus employed and capable of carrying out one embodiment of the process of the invention. While the invention will be described in detail by reference to the embodiment of the process employing the apparatus illustrated in the drawing, it should be noted that it is not intended that the invention be limited thereto but is capable of other embodiments which may extend beyond the scope of the apparatus illustrated. Furthermore, the distribution and circulation of liquids and vapors is illustrated in the drawing by a diagrammatic representation of the apparatus employed. Hence, some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, an aqueous solution of methanol, ethanol and one or more higher alcohols such as propanol and butanol is introduced through line 10 into a distillation tower 11. Tower 11 is operated under proper conditions of temperature and pressure effective to distill overhead methanol and also ethanol as its water-azeotrope. The alcohols are withdrawn through line 12 for further use or treatment outside the scope of the present process. Bottoms from tower 11, comprising the aforementioned $C_3$ and higher alcohols, are withdrawn through valved-line 13. At this point it should be noted that where the original feed contains neither methanol nor ethanol, the aqueous solution of $C_3$ and higher alcohols (or $C_3$ alcohols alone) may be fed directly into line 13. This aqueous solution is next transferred through line 13 into a primary distillation tower 14. Tower 14 is operated under proper conditions of temperature and pressure effective to distill overhead a relatively low-boiling fraction comprising a mixture of the aforementioned $C_3$ and higher alcohols as their water-azeotropes, or as a mixture of these alcohols in aqueous solution which are withdrawn through line 15; while bottoms from tower 14 comprising water, alcohol-free, are withdrawn through line 16.

The overhead from tower 14 is next contacted with a relatively water-insoluble alcohol as an extractive or selective solvent treating agent whose water-azeotrope will form two phases upon condensation. This treating agent has at least four carbon atoms per molecule, such as butanol, and is introduced into line 15 through valved-line 17, with which line 15 connects. It will be noted that it is desirable, but not necessary, that the alcohol treating agent be in a substantially anhydrous form. The resulting mixture in line 15 is next transferred to a separator 18 in which there are obtained (by reason of the insolubility of the treating agent and heavier alcohols in the water present) a lower water-rich phase which is withdrawn through valved-line 19, and an upper alcohol-rich phase which is withdrawn through line 20. The water-rich phase is refluxed through line 19 to an upper point in tower 14 or to an intermediate point through valved-line 21, with which line 19 connects.

The upper alcohol-rich phase from separator 18, containing water in solution is transferred through line 20 to a dehydration tower 22. Tower 22 is operated under conditions of temperature and pressure effective to distill overhead an aqueous solution of the lowest boiling alcohol present (i. e. $C_3$ alcohols, in the present embodiment) which contains substantially all of the water present in the stream entering tower 22 through line 20. This overhead distillate or relatively low-boiling fraction, is transferred through line 23 into line 15, for further treatment in the process described above. Bottoms from tower 22, comprising substantially water-free $C_3$ and higher alcohols, are withdrawn through line 24 as a product of the process. In order to utilize a portion of these dehydrated alcohols as the treating agent in line 15, it is preferable that the total alcohol stream in line 24 be transferred to a distillation tower 25, which is operated under proper conditions of temperature and pressure effective to distill $C_3$ alcohols overhead, which are withdrawn through line 26; while bottoms comprising $C_4$ and higher alcohols are withdrawn through valved-line 27. All or a portion of the substantially water-free alcohols in line 27 may next be recycled via valved-line 28 into line 17 for further use as the treating agent in line 15. It should be noted that the water taken out as bottoms from the primary distillation tower 14, represents all the water present in the feed, water present in the aforementioned azeotropes being returned to this tower as reflux.

In another modification of the process of the invention, the stream of aqueous alcohols in line 13 is first transferred through valved-line 29, into tower 22, via line 20. In tower 22 these alcohols are dehydrated by removing all the water present as $C_3$ alcohol-water azeotropes, which are withdrawn through line 23. Bottoms comprising anhydrous $C_3$ and higher alcohols are withdrawn through line 24 and may be similarly processed as described above. The overhead alcohol-water azeotropes withdrawn through line 23 are next transferred into line 15, for further treatment with the alcohol treating agent introduced into line 15 through line 17, in the process hereinbefore described.

In still another modification of the process of the invention, the aforementioned stream of aqueous alcohols in line 13 is given a preliminary extraction with the treating agent, prior to the primary distillation in tower 14. For this purpose these alcohols are transferred through valved-line 30 to an extraction tower 31. In tower 31 these alcohols are subjected to countercurrent extraction with the aforementioned alcohol treating agent introduced into tower 31 through valved-line 32, with which line 17 connects. Following treatment in tower 31, there is obtained an extract comprising $C_3$ and relatively large quantities of higher alcohols, containing a minor portion of water present in the feed entering tower 31 through line 30. This extract is withdrawn through valve-line 33. The raffinate from tower 31, comprises $C_3$ alcohols and relatively small quantities of the higher alcohols containing a major portion of water present in the feed in line 30. This raffinate is withdrawn through valved-line 34 and is transferred into tower 14 via line 13, for further treatment as hereinbefore described. The extract from tower 31 is transferred through line 33 into tower 22, via line 20, as a feed to the alcohol dehydration step, in the modification of the process of the invention described above. By practicing this preliminary extraction in tower 31, a further reduction in heat-load may be obtained by reason of the reduction of the total quantity of alcohols and water distilled in the primary distillation tower 14. It will be noted that dehydration is effected in tower 22 by refluxing the upper alcohol-rich phase from separator 18 to this tower.

The following specific example will serve to illustrate but is not intended in any way to unduly limit the scope of the present invention.

*Example I*

Employing the apparatus exemplified by the drawing, an aqueous solution of alcohols having the following composition was fractionated in tower 14:

| | Weight percent |
|---|---|
| Propanol | 11 |
| Butanol | 4 |
| Pentanol | 2 |
| Water | 83 |

The bottoms from this tower comprised water, while the overhead fraction was found to have the following composition:

| | Weight percent |
|---|---|
| Propanol | 26.3 |
| Butanol | 9.6 |
| Pentanol | 4.8 |
| Water | 59.3 |

This overhead was next mixed with 42 pounds of $C_4$ and heavier alcohols per 100 pounds of distillate. The $C_4$ and heavier alcohols had the following composition:

| | Weight percent |
|---|---|
| Butanol | 6.6 |
| Pentanol | 11.6 |
| Hexanol | 25.1 |
| Heptanol | 6.8 |
| Octanol | 25.8 |
| Decanol | 15.1 |
| Dodecanol | 9.0 |

The resulting mixture was next separated into two layers. The upper (alcohol-rich) layer was found to contain 99% of the total alcohols (solvent plus feed) and 31% of the water. The lower (water-rich) layer was found to contain 69% of the water and 1% of the total alcohols. The water-rich layer was refluxed to the primary distillation tower 14, where this 1% was refractionated out as the water-azeotropes and returned to the separator, leaving pure water as bottoms. The alcohol-rich layer was sent to another tower (tower 22 in the drawing) where water was removed as the propanol-water azeotrope and returned to the separator, leaving anhydrous alcohols as bottoms.

Having thus described my invention what I claim and desire to secure by Letters Patent is:

1. A method for dehydrating an aqueous solution comprising $C_3$ and higher alcohols which comprises distilling said aqueous solution to obtain a relatively low boiling fraction comprising substantially all of said $C_3$ and higher alcohols in aqueous solution and a relatively high boiling fraction comprising water, contacting said low boiling fraction with a relatively water-insoluble alcohol having at least 4 carbon atoms per molecule as a treating agent, whose water-azeotrope will form two phases upon condensation, in amount sufficient to form a liquid extract, an extract phase comprising said $C_3$ and higher alcohols and a minor portion of water present in said low boiling fraction and a liquid raffinate comprising $C_3$ alcohols and a major portion of water present in said low boiling fraction, dehydrating said extract, and recovering substantially water-free $C_3$ and higher alcohols from said dehydration step.

2. A method for dehydrating an aqueous solution comprising $C_3$ and higher alcohols which comprises contacting said aqueous solution with a relatively water-insoluble alcohol having at least 4 carbon atoms as a first treating agent, whose water-azeotrope will form two phases upon condensation, in an amount sufficient to form a first liquid extract comprising $C_3$ and higher alcohols and a minor portion of water present in said aqueous solution and a first liquid raffinate comprising $C_3$ and higher alcohols and a major portion of water present in said aqueous solution, distilling said first raffinate to obtain a relatively low boiling fraction comprising substantially all of said $C_3$ and higher alcohols in aqueous solution and a relatively high boiling fraction comprising water, contacting said low boiling fraction with a relatively water-insoluble alcohol having at least 4 carbon atoms per molecule as a second treating agent whose water-azeotrope will form two phases upon condensation, in an amount sufficient to form a second liquid extract comprising said $C_3$ and higher alcohols and a minor portion of water present in said low boiling fraction and a second liquid raffinate comprising $C_3$ alcohols and a major portion of water present in said low boiling fraction, dehydrating said first and second extracts, and recovering substantially water-free $C_3$ and higher alcohols from said dehydration step.

3. A method for dehydrating an aqueous solution comprising $C_3$ and higher alcohols which comprises separating said aqueous solution into a relatively low boiling fraction comprising a portion of said alcohols as their water-azeotropes and a relatively high boiling fraction comprising the remaining portion of said alcohols substantially water-free, contacting said low boiling fraction with a relatively water-insoluble alcohol having at least 4 carbon atoms per molecule as a treating agent, whose water-azeotrope will form two phases upon condensation, in an amount sufficient to form a liquid extract comprising said C₃ and higher alcohols and a minor portion of water present in said low boiling fraction and a liquid raffinate comprising C₃ alcohols and a major portion of water present in said low boiling fraction, dehydrating said extract phase, and recovering substantially water-free C₃ and higher alcohols from said dehydration step.

4. A method for dehydrating an aqueous solution comprising C₃ and higher alcohols present in admixture with methanol and ethanol which comprises distilling said aqueous solution to obtain a relatively low boiling fraction comprising methanol and ethanol-water azeotrope and a relatively high boiling fraction comprising an aqueous solution of said C₃ and higher alcohols, distilling said last-mentioned aqueous solution to obtain a relatively low boiling fraction comprising substantially all of said C₃ and higher alcohols in aqueous solution and a relatively high boiling fraction comprising water, contacting said last-mentioned low boiling fraction with a relatively water-insoluble alcohol having at least 4 carbon atoms per molecule as a treating agent, whose water-azeotrope will form two phases upon condensation, in an amount sufficient to form a liquid extract comprising said C₃ and higher alcohols and a minor portion of water present in said last-mentioned low boiling fraction and a liquid raffinate comprising C₃ alcohols and a major portion of water present in said last-mentioned low boiling fraction, dehydrating said extract, and recovering substantially water-free C₃ and higher alcohols from said dehydration step.

5. A method for dehydrating an aqueous solution comprising C₃ and higher alcohols present in admixture with methanol and ethanol which comprises distilling said aqueous solution to obtain a relatively low boiling fraction comprising methanol and ethanol-water azeotrope and a relatively high boiling fraction comprising an aqueous solution of said C₃ and higher alcohols, contacting said high boiling fraction with a relatively water-insoluble alcohol having at least 4 carbon atoms per molecule as a first treating agent, whose water-azeotrope will form two phases upon condensation, in an amount sufficient to form a first liquid extract comprising C₃ and higher alcohols and a minor portion of water present in said high boiling fraction and a first liquid raffinate comprising C₃ and higher alcohols and a major portion of water present in said high boiling fraction, distilling said first raffinate to obtain a relatively low boiling fraction comprising C₃ and higher alcohols in aqueous solution and a relatively high boiling fraction comprising water, contacting said last-mentioned low boiling fraction with a relatively water-insoluble alcohol having at least 4 carbon atoms per molecule as a second treating agent, whose water-azeotrope will form two phases upon condensation, in an amount sufficient to form a second liquid extract comprising said C₃ and higher alcohols and a minor portion of water present in said last-mentioned low boiling fraction and a second liquid raffinate comprising C₃ alcohols and a major portion of water present in said last-mentioned low boiling fraction, dehydrating said first and second extracts, and recovering substantially water-free C₃ and higher alcohols from said dehydration step.

6. A method for dehydrating an aqueous solution comprising C₃ and higher alcohols present in admixture with methanol and ethanol which comprises distilling said aqueous solution to obtain a relatively low boiling fraction comprising methanol and ethanol-water azeotrope and a relatively high boiling fraction comprising an aqueous solution of said C₃ and higher alcohols, separating said last-mentioned aqueous solution into a relatively low boiling fraction comprising a portion of said alcohols as their water-azeotropes and a relatively high boiling fraction comprising the remaining portion of said alcohols substantially water-free, contacting said last-mentioned low boiling fraction with a relatively water-insoluble alcohol having at least 4 carbon atoms per molecule as a treating agent, whose water-azeotrope will form two phases upon condensation, in an amount sufficient to form a liquid raffinate comprising said C₃ and higher alcohols and a minor portion of water present in said last-mentioned low boiling fraction and a liquid raffinate comprising C₃ alcohols and a major portion of water present in said last-mentioned low boiling fraction, and recycling said extract to said dehydration step.

7. A method for dehydrating an aqueous solution comprising propanol which comprises distilling said aqueous solution to obtain a relatively low boiling fraction comprising substantially all of said propanol in aqueous solution and a relatively high boiling fraction comprising water, contacting said low boiling fraction with a relatively water-insoluble alcohol having at least 4 carbon atoms per molecule as a treating agent, whose water-azeotrope will form two phases upon condensation, in an amount sufficient to form a liquid extract comprising propanol and a minor portion of water present in said last-mentioned low boiling fraction and a liquid raffinate comprising propanol and a major portion of water present in said last-mentioned low boiling fraction, dehydrating said extract, and recovering substantially water-free propanol from said dehydration step.

8. A method for dehydrating an aqueous solution comprising propanol present in admixture with methanol and ethanol which comprises distilling said aqueous solution to obtain a relatively low boiling fraction comprising methanol and ethanol-water azeotropes and a relatively high boiling fraction comprising substantially all of said propanol in aqueous solution, distilling said last-mentioned aqueous solution to obtain a relatively low boiling fraction comprising substantially all of said propanol in aqueous solution and a relatively high boiling fraction comprising water, contacting said low boiling fraction with a relatively water-insoluble alcohol having at least 4 carbon atoms per molecule as a treating agent, whose water-azeotrope will form two phases upon condensation, in an amount sufficient to form a liquid extract comprising propanol and a minor portion of water present in said last-mentioned low boiling fraction and a liquid raffiniate comprising propanol and a major portion of water present in said last-mentioned low boiling fraction, dehydrating said extract, and recovering substantially water-free propanol from said dehydration step.

9. A method for dehydrating an aqueous solution comprising propanol which comprises distilling said aqueous solution to obtain a relatively low boiling fraction comprising at least a portion of said propanol as its water-azeotrope, and a relatively high boiling fraction comprising the remaining portion of said propanol substantially water-free, contacting said low boiling fraction with a relatively water-insoluble alcohol having at least 4 carbon atoms per molecule as a treating agent, whose water-azeotrope will form two phases upon condensation, in an amount sufficient to form a liquid extract comprising propanol and a minor portion of water present in said last-mentioned low boiling fraction and a liquid raffinate comprising propanol and a major portion of water present in said last-mentioned low boiling fraction, dehydrating said extract, and recovering substantially water-free propanol from said dehydration step.

10. A method for dehydrating an aqueous solution comprising propanol present in admixture with methanol and ethanol which comprises distilling said aqueous solution to obtain a relatively low boiling fraction comprising methanol and ethanol-water azeotrope and a relatively high boiling fraction comprising substantially all of said propanol in aqueous solution, distilling said last-mentioned aqueous solution to obtain a relatively low boiling fraction comprising at least a portion of said propanol as its water-azeotrope and a relatively high boiling fraction comprising the remaining portion of said propanol substantially water-free, contacting said low boiling fraction with a relatively water-insoluble alcohol having at least 4 carbon atoms per molecule as a treating agent, whose water-azeotrope will form two phases upon condensation, in an amount sufficient to form a liquid extract comprising propanol and a minor portion of water present in said last-mentioned low boiling fraction and a liquid raffinate comprising propanol and a major portion of water present in said last-mentioned low boiling fraction, dehydrating said extract, and recovering substantially water-free propanol from said dehydration step.

11. A method for dehydrating an aqueous solution comprising $C_3$ and higher alcohols which comprises contacting said aqueous solution with a relatively water-insoluble alcohol having at least 4 carbon atoms per molecule as a treating agent, whose water-azeotrope will form two phases upon condensation, in an amount sufficient to form a liquid extract comprising $C_3$ and higher alcohols and a minor portion of water present in said aqueous solution and a liquid raffinate comprising $C_3$ alcohols and a major portion of water present in said aqueous solution, dehydrating said extract, and recovering substantially water-free $C_3$ and higher alcohols from said dehydration step.

12. A method for dehydrating an aqueous solution comprising propanol which comprises contacting said aqueous solution with a relatively water-insoluble alcohol having at least 4 carbon atoms per molecule as a treating agent, whose water-azeotrope will form two phases upon condensation, in an amount sufficient to form a liquid extract comprising propanol and a minor portion of water present in said aqueous solution and a liquid raffinate comprising propanol and a major portion of water present in said aqueous solution, dehydrating said extract and recovering substantially water-free propanol from said dehydration step.

13. A method for dehydrating an aqueous solution comprising $C_3$ and higher alcohols which comprises contacting said aqueous solution with butanol as a treating agent, in an amount sufficient to form a liquid extract comprising $C_3$ and higher alcohols and a minor portion of water present in said aqueous solution and a liquid raffinate comprising $C_3$ alcohols and a major portion of water present in said aqueous solution, dehydrating said extract, and recovering substantially water-free $C_3$ and higher alcohols from said dehydration step.

14. A method for dehydrating an aqueous solution comprising $C_3$ and higher alcohols which comprises contacting said aqueous solution with a mixture of relatively water-insoluble alcohols each having at least 4 carbon atoms per molecule as a treating agent, whose water-azeotropes will form two phases upon condensation, in an amount sufficient to form a liquid extract comprising $C_3$ and higher alcohols and a minor portion of water present in said aqueous solution and a liquid raffinate comprising $C_3$ alcohols and a major portion of water present in said aqueous solution, dehydrating said extract, and recovering substantially water-free $C_3$ and higher alcohols from said dehydration step.

WILLIAM P. BURTON.

REFERENCES CITED

The following references are of record in the file of this patent:

UNITED STATES PATENTS

| Number | Name | Date |
| --- | --- | --- |
| 1,524,192 | Mann | Jan. 27, 1925 |
| 1,688,731 | Merley | Oct. 23, 1928 |
| 1,702,495 | Clapp | Feb. 19, 1929 |
| 1,911,832 | Lewis | May 30, 1933 |
| 2,050,513 | Van Peski | Aug. 11, 1936 |
| 2,080,194 | Barbet | May 11, 1937 |
| 2,095,347 | Reichardt | Oct. 12, 1937 |
| 2,356,348 | Patterson | Aug. 22, 1944 |
| 2,402,077 | Patterson | June 11, 1946 |
| 2,558,557 | Hess et al. | June 26, 1951 |

FOREIGN PATENTS

| Number | Country | Date |
| --- | --- | --- |
| 566,025 | Great Britain | Dec. 11, 1944 |
| 315,012 | Germany | Oct. 23, 1919 |